(12) United States Patent
Hiemstra et al.

(10) Patent No.: US 8,931,842 B2
(45) Date of Patent: Jan. 13, 2015

(54) CONTINUOUSLY ENGAGED RECLINER FREEPLAY SYSTEM AND FINE-BLANKED GEAR HUB

(75) Inventors: Bruce A. Hiemstra, Ann Arbor, MI (US); Michael R. Bittner, Canton, MI (US); Scott A. Profozich, Canton, MI (US); Michael J. Kapusky, Milan, MI (US)

(73) Assignee: Johnson Controls Technology Company, Holland, MI (US)

( * ) Notice: Subject to any disclaimer, the term of this patent is extended or adjusted under 35 U.S.C. 154(b) by 179 days.

(21) Appl. No.: 13/389,459

(22) PCT Filed: Aug. 12, 2010

(86) PCT No.: PCT/US2010/045308
§ 371 (c)(1),
(2), (4) Date: Mar. 20, 2012

(87) PCT Pub. No.: WO2011/019904
PCT Pub. Date: Feb. 17, 2011

(65) Prior Publication Data
US 2012/0169102 A1 Jul. 5, 2012

Related U.S. Application Data

(60) Provisional application No. 61/233,321, filed on Aug. 12, 2009.

(51) Int. Cl.
*B60N 2/02* (2006.01)
*B60N 2/225* (2006.01)

(52) U.S. Cl.
CPC ........... *B60N 2/2252* (2013.01); *B60N 2/2254* (2013.01)
USPC ....................................................... 297/362

(58) Field of Classification Search
USPC ................................................ 297/362, 367
See application file for complete search history.

(56) References Cited

U.S. PATENT DOCUMENTS

| | | | | | |
|---|---|---|---|---|---|
| 2,072,308 | A | * | 3/1937 | Labin | 29/893.33 |
| 4,254,540 | A | * | 3/1981 | Bilak | 29/893.36 |
| 4,786,110 | A | * | 11/1988 | Mahling et al. | 297/362 |
| 4,832,405 | A | * | 5/1989 | Werner et al. | 297/362 |
| 5,363,714 | A | | 11/1994 | Hoguchi | |
| 5,398,408 | A | | 3/1995 | Bernet | |
| 6,619,743 | B1 | * | 9/2003 | Scholz et al. | 297/362 |
| 7,243,994 | B2 | | 7/2007 | Cha | |
| 7,278,689 | B2 | | 10/2007 | Guillouet | |
| 2005/0231017 | A1 | | 10/2005 | Lange | |
| 2007/0138853 | A1 | | 6/2007 | Ito et al. | |

* cited by examiner

*Primary Examiner* — Sarah B McPartlin
(74) *Attorney, Agent, or Firm* — Dickinson Wright PLLC

(57) ABSTRACT

An adjustment device for a seat and more particularly, a carrier in the adjustment device having anti-rock features and increased longevity and a method of forming the outer gear out of hardened steel without the need for heat treating.

19 Claims, 16 Drawing Sheets

# CONTINUOUSLY ENGAGED RECLINER FREEPLAY SYSTEM AND FINE-BLANKED GEAR HUB

CROSS-REFERENCE TO RELATED APPLICATIONS

This U.S. National Stage Patent Application claims the benefit of International Application No. PCT/US10/045308 filed Aug. 12, 2010, entitled "Continuously Engaged Recliner Freeplay System And Fine-Blanked Gear Hub" and U.S. Provisional Patent Application Ser. No. 61/233,321 filed Aug. 12, 2009, entitled "Continuously Engaged Recliner Freeplay System And Fine-Blanked Gear Hub," the entire disclosures of the applications being considered part of the disclosure of this application and hereby incorporated by reference.

BACKGROUND

The present invention relates to an adjustment device for a vehicle seat and more particularly, to a tilt adjustment device which allows the seat back of a vehicle seat to move relative to the base of the vehicle seat. This tilt device is also referred to as a recline mechanism and generally includes an inner gear and outer gear which are moveable to relative one another in order to provide tilt adjustment of the seat back relative to the seat base. Typically, the inner gear is fitted within the outer gear and is at least one tooth smaller such that when a rotating adjustment element drives an eccentric ring or carrier about an axis causing wedge segments to be dragged and eccentrically wedged around the rotational axis, the outer gear moves radially about an axis. Typically, for each rotation of the carrier and wedge segments, the outer gear is driven approximately ten degrees about the axis. After the seat back is in the preferred position, the inner and outer gears are locked from relative movement due to the wedge segments ensuring that the inner and outer gears stay meshed.

The above described rotation mechanism is commonly referred to as a five-door rotary recline mechanism. The five-door recline mechanism works well for vehicles seats where the seats rearward of the seat with the recline mechanism has a separate door. For example, the five-door recline mechanism is common on the front seats of sedans, SUV's and minivans. However, for some seat locations such as the front seats of coupes, middles seats of station wagons, SUV's and minivans, as well as the rear seats of five-door or hatchback vehicles, it is desirable to at times allow the seat back to pivot freely forward. For example, it may be desirable to fold the seat back down to allow ingress and egress quickly without using the five-door rotary recline mechanism. Typically, recline mechanisms that include these additional features that allow free motion of the seat back relative to the seat base in certain conditions are referred to as three-door rotary recline mechanisms. The three-door recline mechanism generally includes a five-door mechanism described above, modified with minor changes, and an additional latch assembly that engages gear teeth on the outer edge of the outer gear. Generally, the latch assembly allows the seat back to be released from engaging the outer gear of the five-door recline mechanism such that it may rotate independent of the five-door recline mechanism that is included in the three-door recline mechanism. In some embodiments, the free rotation of the vehicle seat back also allows through additional elements for the track to be released and the seat to slide forward in one motion, typically to allow easy ingress and egress from the vehicle seat.

The outer and inner gears of the five-door recline mechanism and also the five-door recline mechanism when used with the modified outer gear in combination with the latch assembly of the three-door rotary recline mechanism are typically stamped out of a mild steel to allow easier forming of the gears. The mild steel allows the metal to easily be formed without becoming brittle or cracking during the various forming steps. In particular, the outer gear includes a hub which extends outwardly from the original plane of the sheet of metal forcing manufacturers to traditionally use only mild steel for the forming of the outer gear. Since mild steel is used in the forming process of the inner and outer gears, manufacturers had to heat treat the gears once the forming process was complete. The heat treating process hardened the gears thereby providing increased life expectancy and improved wear characteristics. Heat treating added additional processing steps that were time-consuming and expensive. The reason that most inner gears and all outer gears are formed out of a mild steel such as 1020, 4130, or 4140 steel is that the higher carbon content of stronger steels cause them to be brittle and during the forming process, and in particular, the forming of the outwardly extending hub, the edges of the hub would crack or shatter on the outer gear. Therefore, manufacturers found it impossible to stamp the outer gear out of a higher quality steel while eliminating the heat treating process.

The rotary recline mechanisms also further include a carrier which pushes a pair of wedges against a bearing located inside of the inner gear. The carrier is rotated forcing the inner gear against the outer gear. The inner gear is configured to have one or more fewer teeth than the outer gear such that when the inner gear is forced into engagement with the outer gear and the carrier spins for each revolution of the carrier, the outer gear is forced approximately ten degrees about the axis of rotation. Certain designs of carriers while providing sufficient wedge capabilities allowed unintended rocking of the seat back as the main point of pressure on the bearing was centered between the two wedges. In addition, in seat assemblies where the power tilt mechanism was frequently used, the design of the carriers and bearings could cause premature failure. Therefore, until now, manufacturers have not been able to provide an anti-rock carrier with improved longevity.

SUMMARY OF THE INVENTION

The invention relates to an adjustment device for a seat and more particularly, to a tilt adjustment device for a seat back. The adjustment device includes an inner and outer gear moveable relative to one another in order to provide adjustment of a seat back relative to a seat frame. After a preferred adjustment of the seat back is made, the inner and outer gears are locked from such relative movement with the use of an eccentric element actuated by an adjustment element.

The present invention uses a process of forming the outer gear that forges as well as forms the outer gear. This process of forging creates concave surfaces at certain points to move the material from the end cap of the hub, which is later discarded, to the hub itself. By forming the concave surfaces in specified areas as described in the detail description below, the present invention allows the use of harder steels than previously possible and eliminates the need for the additional heat treating step. In addition, the process of forging as well forming further cold tempers the material such that the end resulting material in the wear areas adjacent to the forged portions are of increased hardness when the outer gear is finally formed.

The present invention utilizes a carrier having at least three unique characteristics to create an anti-rock and increased longevity carrier. The carrier of the present invention utilizes a carrier tab centered between the wedges that also bear against the bearing surface to provide additional load surface. In addition, the inner circumferential surface of the carrier is profiled such that it is non-circular in nature. More specifically, the carrier is formed to have a profiled section underneath the carrier tab such that load is not applied to the center hub of the outer gear directly underneath the carrier. Instead, the load on the hub of the outer gear is displaced to each side of the carrier tab and occurs under the wedges. Therefore, with the two points of displaced contact, the seat back is prevented from rocking such as occurs with carriers where the load is applied directly underneath the carrier tab or centered between the two wedges. The first profiled surface on the inner circumferential surface also allows a pocket where additional grease may accumulate thereby providing increased longevity. To further provide the anti-rock motion and further increase longevity, the carrier also includes a second profiled portion in some embodiments directly opposite of the first profiled section.

DETAILED DESCRIPTION

Figure 1:
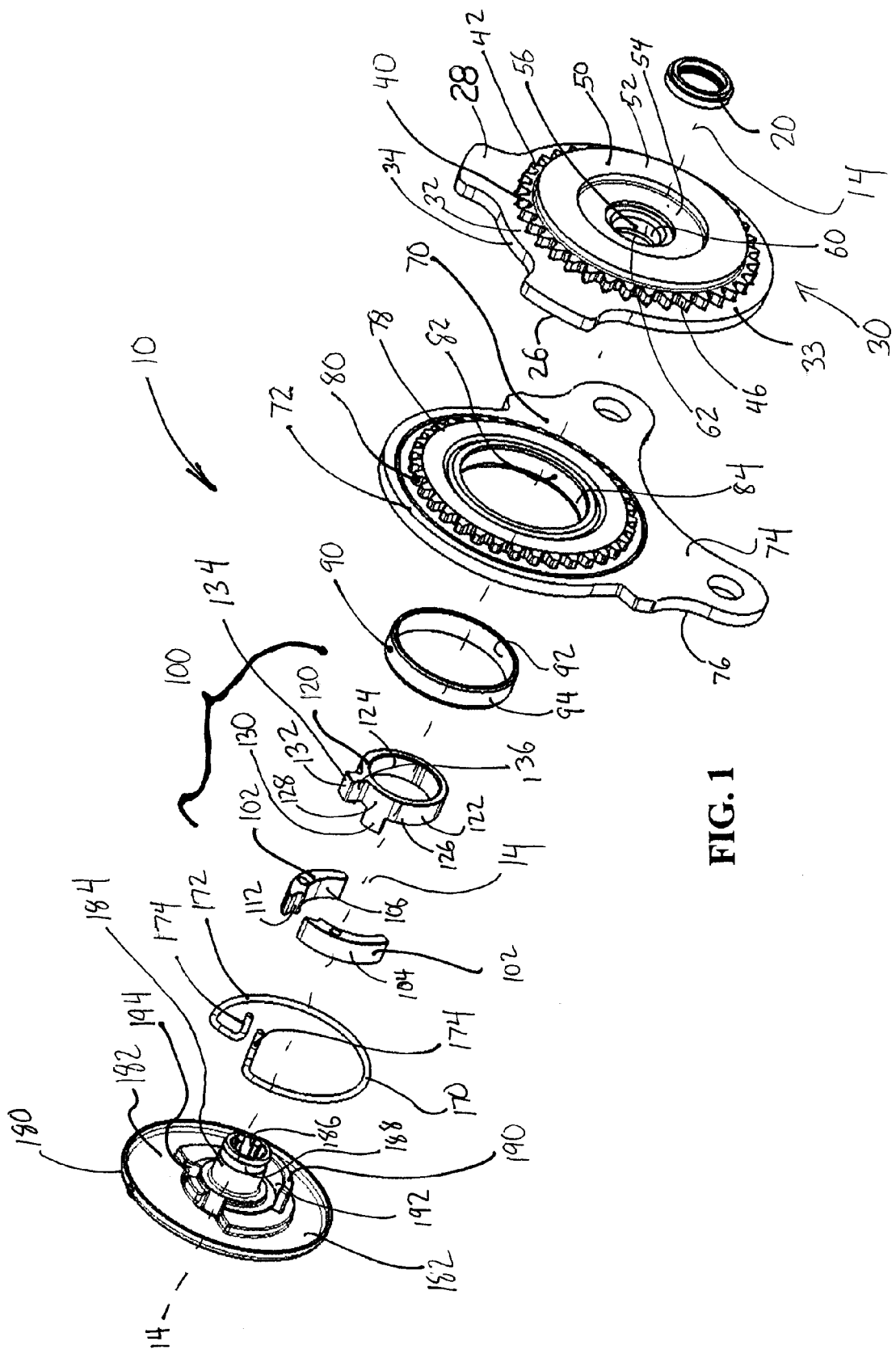
FIG. 1 is a partial exploded perspective view of a rotary recline mechanism.
Figure 2:
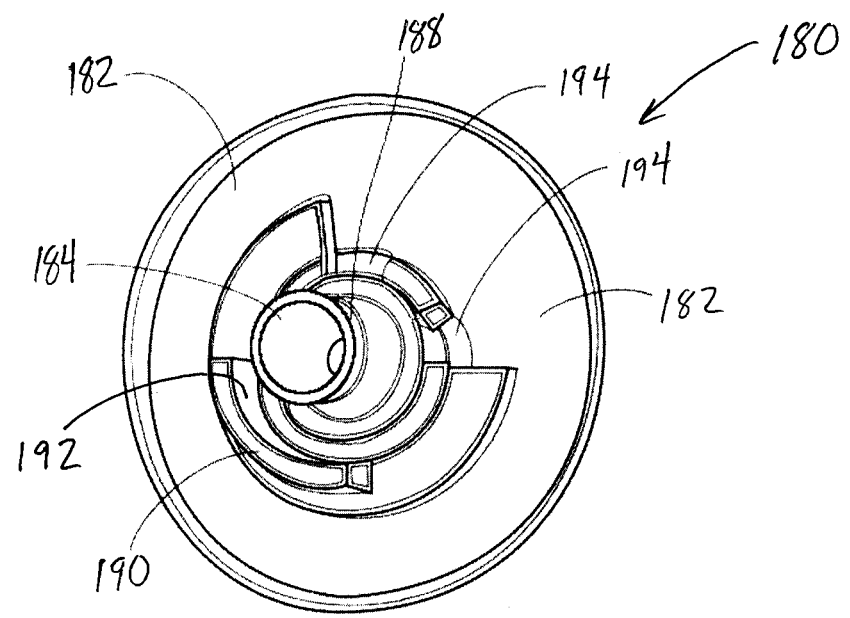
FIG. 2 is a perspective view of the rotating adjustment element.
Figure 3:
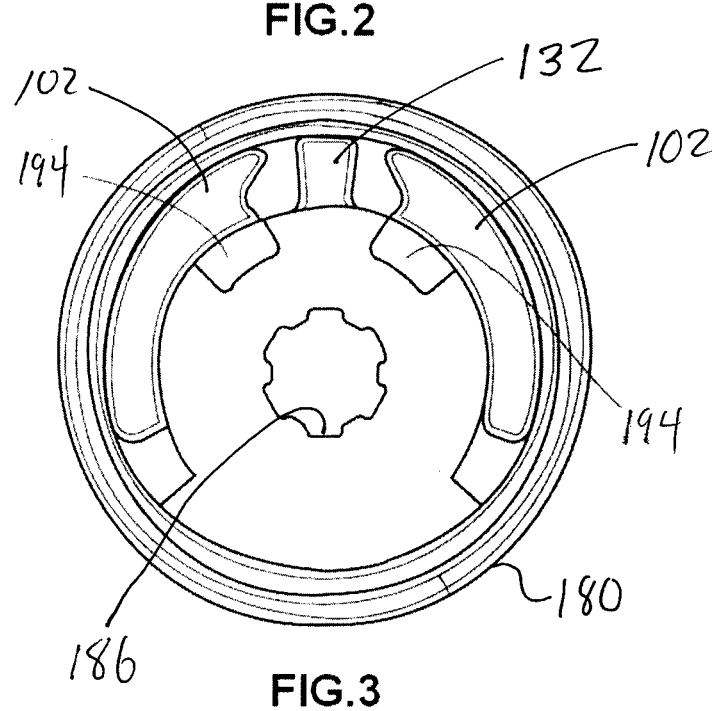
FIG. 3 is a cut-away side view of the rotating adjustment element bearing, carrier and wedges.
Figure 4:
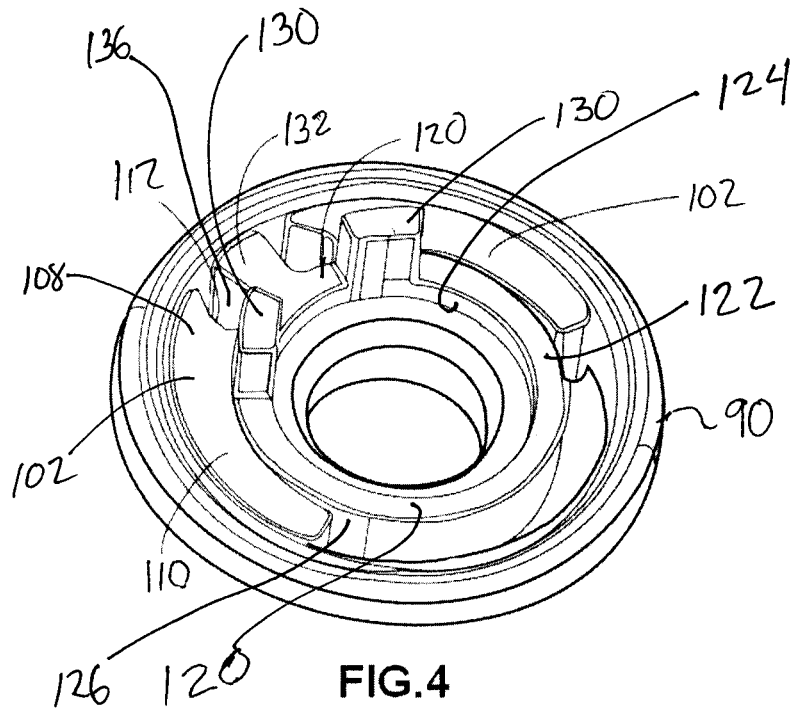
FIG. 4 is a perspective view of the carrier and wedges assembled into the bearing and rotary adjustment element.
Figure 5:
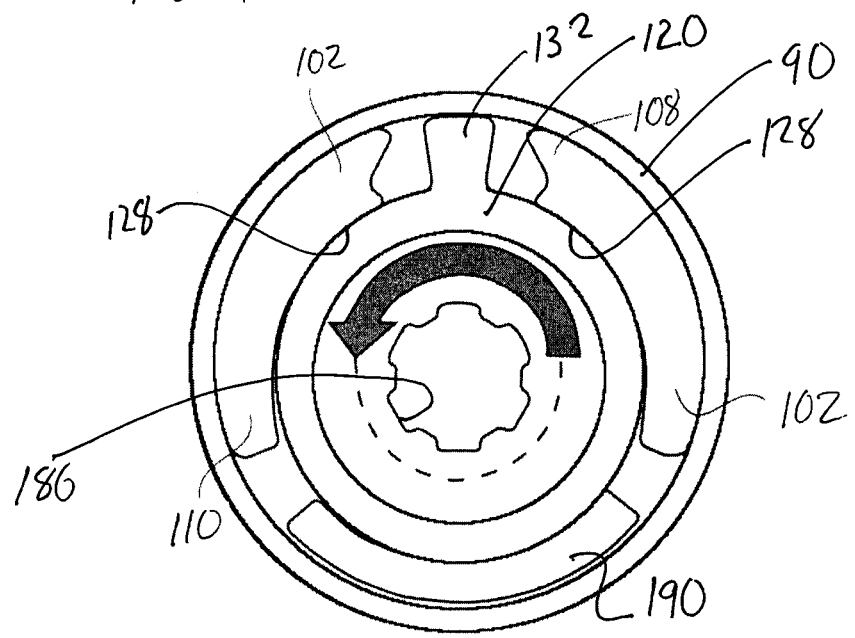
FIG. 5 is an assembled side view of the carrier and wedges assembled into the bearing and rotary adjustment element.
Figure 6:
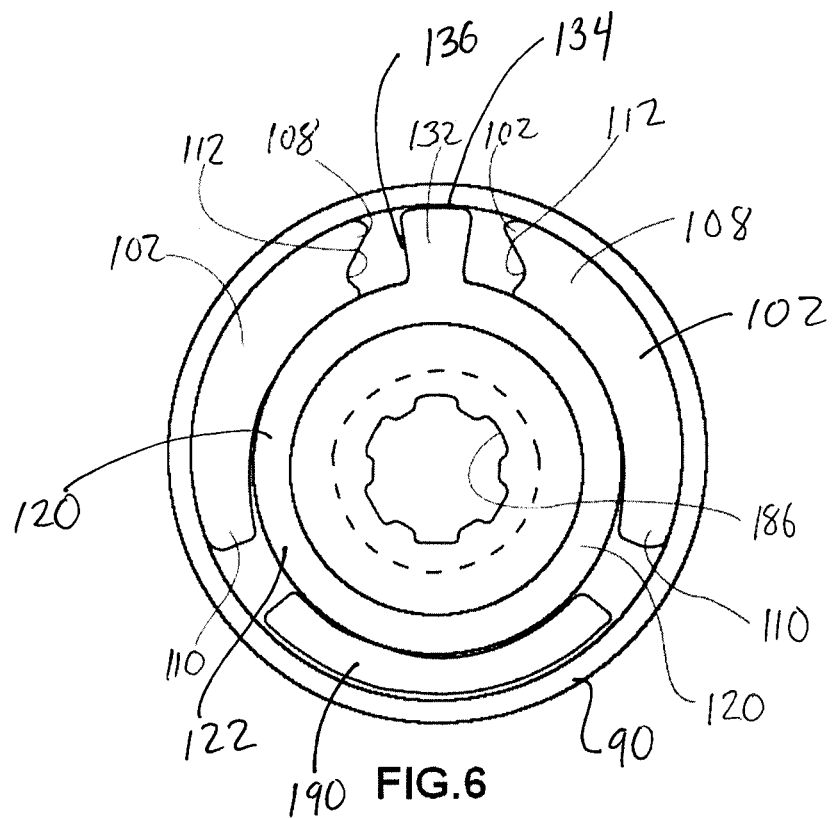
FIG. 6 is an assembled side view of the carrier and wedges assembled into the bearing and rotary adjustment element.
Figure 7:
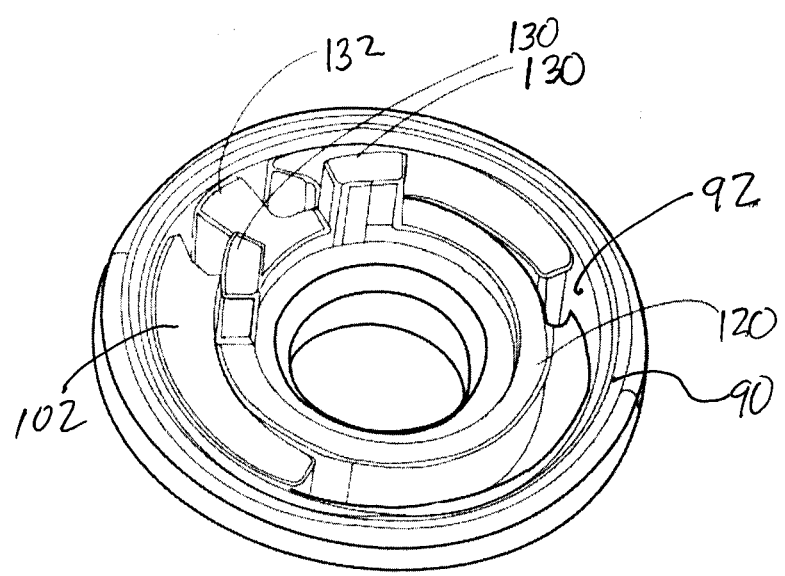
FIG. 7 is a perspective view of the carrier and wedges assembled into the bearing and rotary adjustment element.

The present invention is generally directed to a rotary recline mechanism or adjustment device 10 that is typically used to provide powered tilt adjustments to the seat back of a seat base about an axis of rotation 14. The rotary recline mechanism 10 may occur in a variety of configurations and may be generally applicable to what is commonly referred to as a five-door rotary recline mechanism or a three-door rotary recline mechanism. It should be understood that a modified five-door rotary recline mechanism is typically included into the three-door rotary recline mechanism with minor adjustments in particular to an outer gear 30. For example, the outer gear is commonly known to have different profiled outer edges depending upon whether the outer gear is configured to be in a five-door rotary recline mechanism or a three-door rotary recline mechanism. Although not illustrated, the outer gear is generally configured to have gear teeth to engage a latch mechanism to allow free tilting about the axis of rotation of the seat back in a three-door rotary recline mechanism. As illustrated in FIG. 1, the major components of a rotary recline mechanism 10 include a washer or retainer 20, an outer gear 30, an inner gear 70, a bearing 90, an eccentric element assembly 100 having wedges 102 and eccentric ring or carrier 120, a spring 170 and a rotating adjustment element 180. When assembled, these generally form the rotary recline mechanism 10. The washer or retainer 20 is generally configured to also fit around a hub 184 on the rotary adjustment element 180 thereby coupling all of the elements in FIG. 1 as described above together.

While the outer gear 30 may have a variety of styles, shapes and configurations depending upon the desired embodiment in which it is located, the outer gear 30 generally includes an outer portion 32 having an outer edge 34, an intermediate portion 40 which includes a tooth region 42 and an inner portion 50 having a center hub 56. The outer gear 30 illustrated in the Figures is to be generally used in what is commonly known as a five-door rotary recline mechanism. However, with other minor changes to the profile, that outer gear can be easily used in other rotary recline mechanisms with the present invention also being applicable.

The outer gear 30 may generally include a first side 26 and a second side 28. The first side 26 may also be referred to as the inner face of the outer gear and the second side 28 may also be referred to as the outer face of the outer gear. The outer portion 32 generally includes an outer extent 33 having an outer edge 34. The outer edge 34 and outer extent 33 may be configured as desired to fit in a variety of different applications. The outer portion 32 also could be considered to having a first surface 36 and a second surface 38 which generally form planes.

The intermediate portion 40 as described above generally includes the tooth region 42. The tooth region 42 generally includes female gear teeth 44 on the inner side 26 and male gear teeth 46 on the outer side 28. The female and male gear teeth 44, 46 are the result of stamping the gear teeth into the outer gear 30 such that when the outer gear 30 is formed and the gear cavity 48 defined by the intermediate portion 40 and inner portion 50 has female gear teeth 44 into which the inner gear 70 may be placed.

Figure 11:
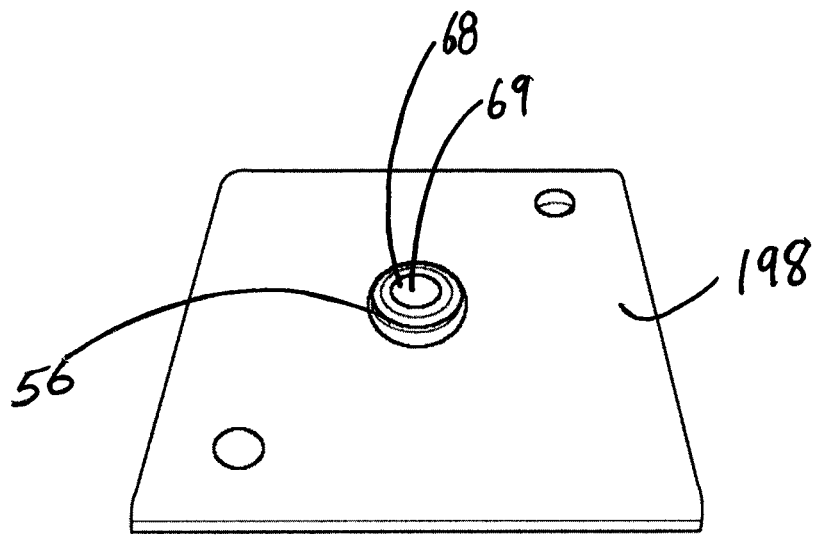
FIG. 11 illustrates the first step of forming a metal sheet to have an enclosed hub having a concave end cap.
Figure 12:
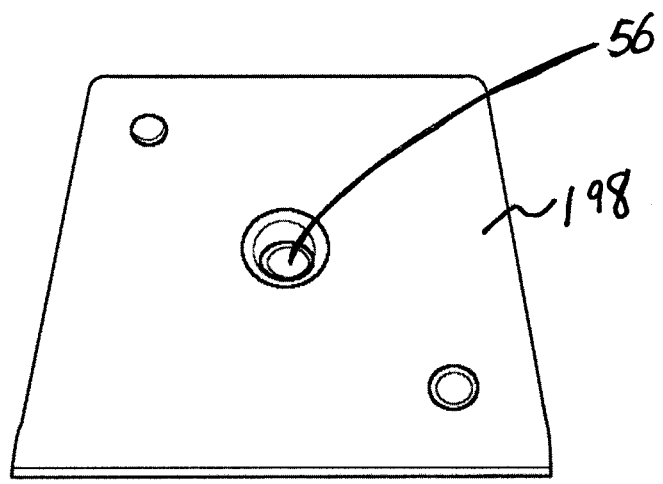
FIG. 12 illustrates the opposing side of the metal sheet in FIG. 11.

The inner portion 50 may have a variety of styles, shapes and configurations depending upon the desired application of the outer gear 30. The inner portion 50 may be configured to be welded to other members including raised portions which act as weld surfaces for other forming techniques to configure the outer gear as desired to work in a rotary recline system 10. For the illustrated outer gear 30, the inner portion generally includes a first portion 52 extending inwardly toward the center or axis of rotation 14 and a second optional portion 54 recessed from the first portion 52. The inner portion 50 also includes the center hub 56 which extends outwardly from the plane formed by the first portion 52 into the gear cavity 48 and in some embodiments, beyond the first surface 36 of the outer gear's inner face. The center hub 56 extends a set distance into the gear cavity 48 or beyond the gear cavity 48 and is generally configured to have an outer circumferential surface 58 and an inner circumferential surface 60. The inner circumferential surface 60 generally defines an axial opening with a specified diameter in the center hub 56 and ends in an end surface 64. The end surface 64 may be shaped to have various beveled surfaces as illustrated in the Figures. As illustrated in FIGS. 11 and 12, during the forming process, the center hub 56 may also include an end cap which is later removed and during the forming process, this end cap may have a concave surface 69. The outer surface 28 of the outer gear 30 may also be configured around the area of the center hub 56 to have various bevels or other shapes as desired. Although not illustrated, the concave surface 69 may also be on the inside of the end cap 68 or both sides of the end cap 68 may include concave surfaces.

The inner gear 70 generally includes an outer portion 72, a gear portion 78 with male gear teeth 80 and an axial hub 82 having an inner race 84. The inner gear 70 as described above generally fits within the gear cavity 48 formed by the outer gear 30. The male gear teeth 80 generally have one less or in some cases, two or less gear teeth than the female gear teeth 44 of the outer gear 30. The axial hub 82 formed by the inner gear 70 includes the inner race 84 against which the bearing 90 is placed. In some embodiments, the bearing 90 may be allowed or configured to rotate freely against the inner race and in other embodiments, the bearing 90 can be press fit against the inner race 84.

The bearing 90 generally includes an inner surface and an outer surface 94 wherein the outer surface 94 is configured to be engaged against the inner race 84. The bearing 90 also generally has a width similar to that of the axial hub 82 of the inner gear 70. The bearing 90 is generally formed as is well known in the art.

An eccentric element assembly 100 is configured to fit within the bearing 90 specifically within the inner surface 92 and rotate therein against the inner surface 92 applying pressure to one area of the bearing 90. The eccentric element assembly 100 is generally formed from an eccentric ring or carrier 120 and wedges 102 placed between the carrier 120 and the inner surface 92 of the bearing 90. The wedges 102 are generally configured to have an outer face 104 which bear against the inner surface 92 of the bearing and an inner face 106 which bears against the carrier 120. The wedges 102 also have a wide end 108 and a narrow end 110 wherein the wide end 108 is configured to be in close proximity to the carrier tab 132 on the carrier 120. The wedges 102 may also further include notches 112 on the wide end 108.

The carrier 120 generally includes a circumferential portion 122 having an inner surface 124, and an outer circumferential surface 126 that is interrupted by the outwardly extending carrier tab 132. The outer circumferential surface 126 includes an area of wedge load surfaces 128 in close proximity to the carrier tab 132. One or more drive tabs 130 may extend from the circumferential portion 122 approximately parallel to the axis of rotation 14 which also acts generally as the center for the radius of the circumferential portion 122. The carrier tab 132 may be shaped in a variety of sizes, shapes and configurations but generally includes a carrier tab load surface 134 which is in close proximity of the inner surface 92 of the bearing 90. Extending between the carrier tab load surface 134 and the circumferential portion 122, specifically the outer circumferential surface 126 are the carrier tab side surfaces 136. The carrier tab 132 and specifically the carrier tab load surface 134 is configured to support the inner surface 92 of the bearing 90 when a high load, such as a crash load, is seen by the recliner. This load tends to collapse the center area and the carrier tab 312 resists this collapse More specifically, the carrier tab 132 may act as a brace between the bearing 90 and the hub 56 in high load situations to distribute the load and increase the load carrying capabilities to make the recliner stronger. The applied load is an eccentric load such that as the carrier tab rotates around inside of the bearing 90, the male teeth 80 of the inner gear and female gear teeth 44 of the outer gear 30 which are in approximate radial alignment with the carrier tab 132 wherein the radial alignment extends from the axis of rotation 14 through the carrier tab 132 are directly engaged. In comparison, the directly opposing male gear teeth 80 and female gear teeth 44 are disengaged as discussed above as the inner gear 70 has one less gear tooth than the outer gear 30. Therefore, as the carrier 120 rotates within the bearing 90, the eccentric load applied through the carrier tab 132 and wedges 102 moves the inner gear into contact with the outer gear eccentrically such that as the inner gear is driven into engagement with the outer gear in this eccentric fashion, the outer gear is forced to rotate relative to the inner gear and more specifically, as described above, the outer gear is driven approximately ten degrees radially about the axis of rotation for each rotation of the carrier 120 about the axis of rotation 14.

Figure 8:
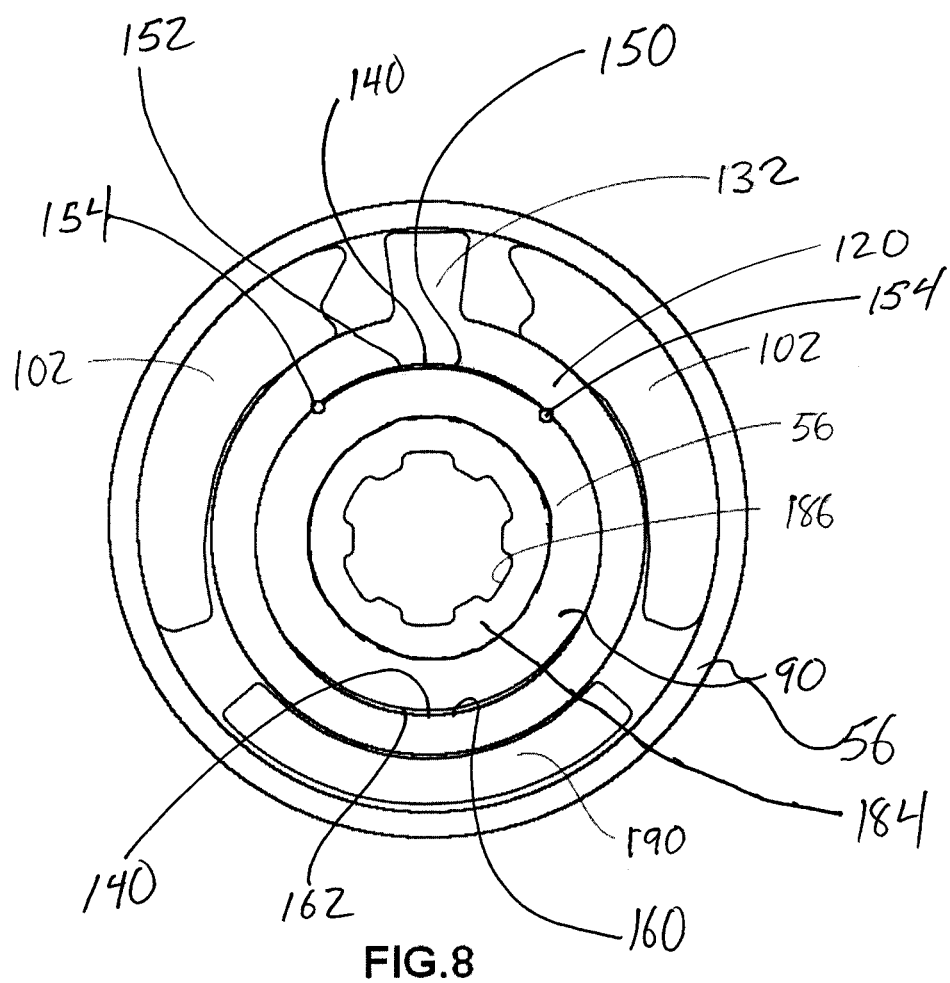
FIG. 8 is an enlarged side view of a carrier and wedges assembled into the bearing and rotary adjustment element showing the profiled portions as well as the displaced load points.
Figure 9:
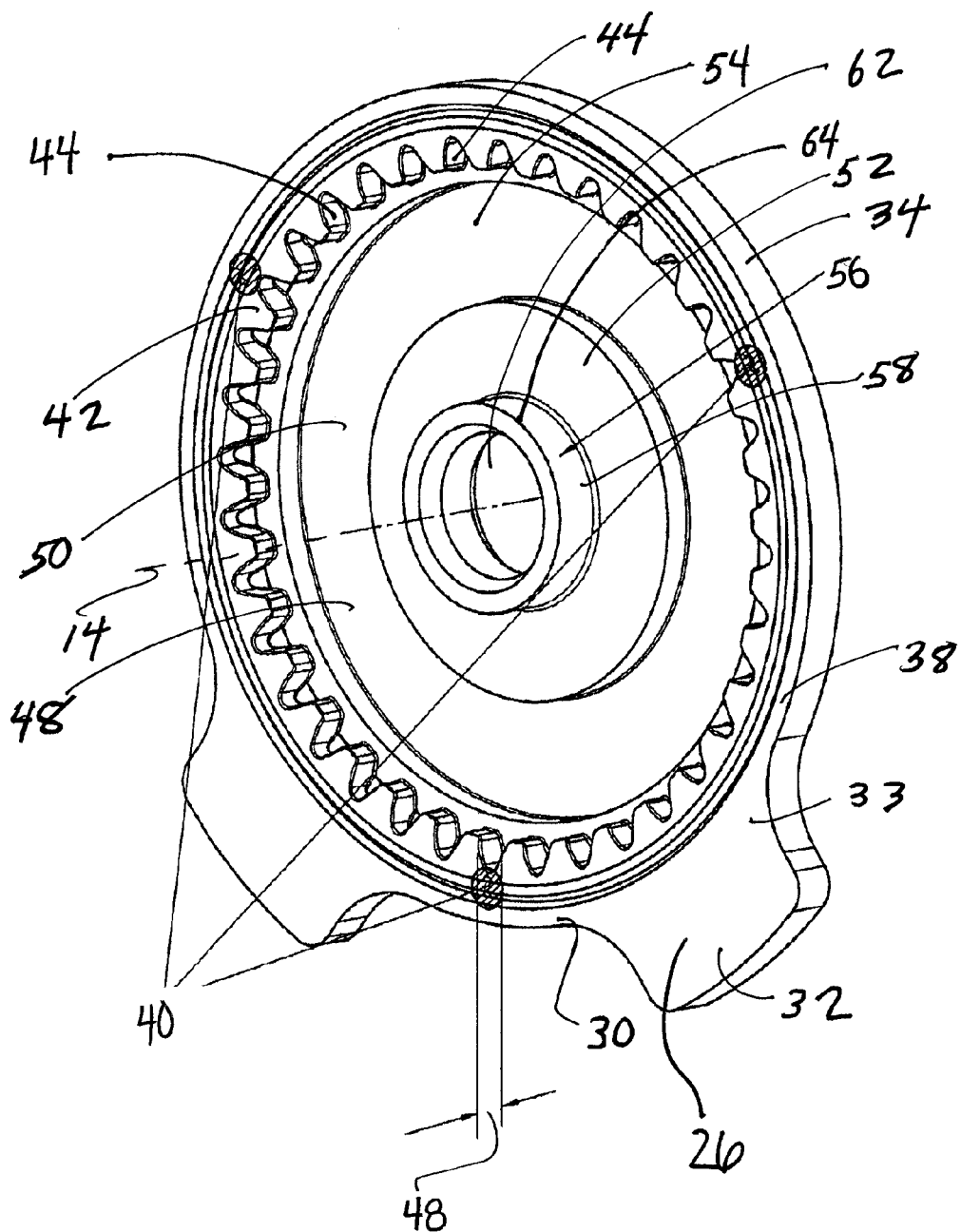
FIG. 9 is a perspective view of the inner face of the outer gear showing the formed central hub.
Figure 10:
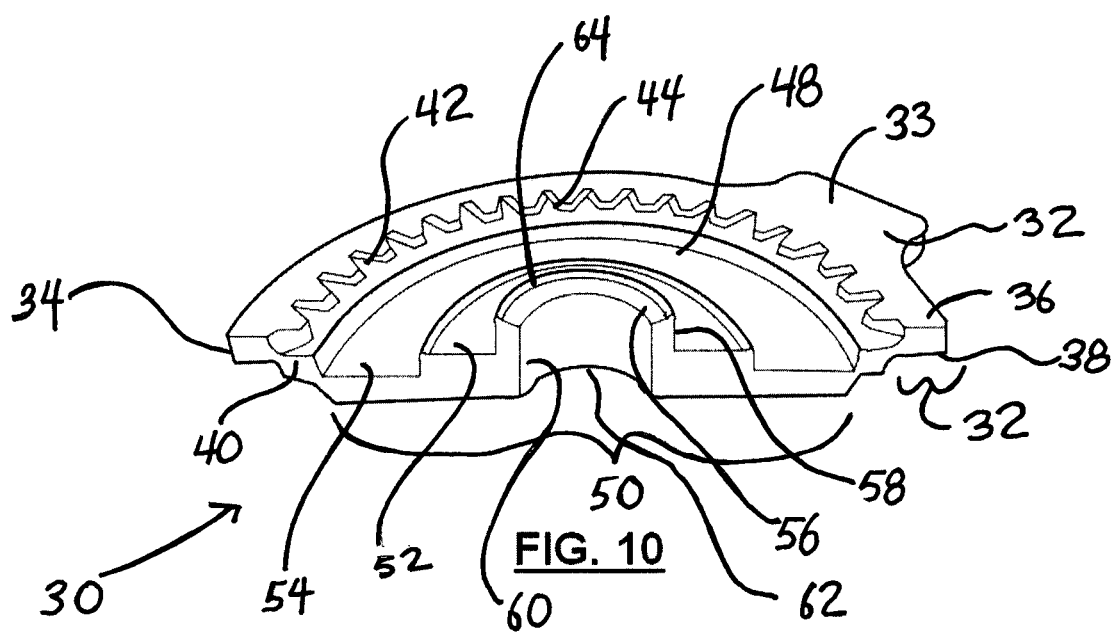
FIG. 10 illustrates a rear perspective view of an outer gear cut in half to better illustrate the profile of the various portions of the outer gear.

To improve the longevity of the carrier 120 and thereby the longevity of the rotary recline mechanism 10, as well as provide an anti-rock configuration, the carrier 120 specifically the inner surface 124 includes at least one profiled inner portion 140. The addition of these profiled inner portions 140 means that the inner surface 124 of the carrier 120 is not a true circle having a defined radius from the axis of rotation 14 but instead, has areas in the profiled inner portions 140 that have slightly greater distances to the inner surface 124 from the axis of rotation 14 than the areas which are not considered profiled inner portions 140. In the illustrated embodiments, specifically as illustrated in FIG. 8, the profiled inner portions include a first profiled area 150 and also an optional second profiled area 160. The first profiled area 150 occurs directly under the carrier tab 132 on the inner surface 124 and creates the anti-rock features of the current invention's rotary recline mechanism 10. The first profiled area 150 generally extends completely underneath the carrier tab 132 and typically extends for some distance to each side of the carrier tab 132 to under the wedges 102. Where the first profiled area ends, and the inner surface 124 returns to the set radius are the displaced inner load areas 154. The displaced inner load areas 154 are spaced on each side of the carrier tab 132 under the wedges 102. By displacing the load areas 154 from directly under the carrier tab 132 as is typically common, the two displaced load areas provide a stable anti-rock configuration instead of a single point of load which may create a rocking motion of the outer gear.

The second profiled area 160 is generally on the opposing side of the inner surface 124 from the first profiled area 150. The second profiled area 160 is optional but is illustrated in FIG. 8 as allowing for an additional grease pocket for grease to be located thereby improving the longevity of the carrier 120 when it spins within the bearing 90.

The rotary recline mechanism 10 may further include springs or a spring 170 having a radial portion 172 and leg ends 174. The spring 170 is generally configured to locate the wedges 102 and hold the wedges 102 into the proper position between the carrier 120 and the bearing 90.

The carrier 120 is driven in its rotational movement by the rotating adjustment element 180. The rotating adjustment element 180 generally includes an outer cover 182, a hub 184 extending from the outer cover 182 and female tooth shoulder 194. The female tooth shoulder 194 engages the drive tab 130 on the carrier 120 and as the rotating adjustment element rotates, the female tooth shoulder 194 engages the drive tab 130 forcing the carrier 120 to rotate within the bearing 90. The hub 184 on the rotating adjustment element 180 may further include a retainer ring groove 188 to which the retainer or washer 20 is coupled to assemble the complete mechanism together. The rotating adjustment element 180 may also include a race support 190 having a race surface 192. The race support 190 prevents the wedges 102 from being displaced from the wedge load surface area 128 on the carrier 120. The hub 184 may also include an axial hole 186 having a key stop into which a power drive mechanism is engaged to rotate the rotating adjustment element 180.

As described above, the present invention provides a unique method of forming the outer gear 30. Traditionally, the outer gear 30 was formed of a mild steel such as a 4130 steel or other low carbon steel and then heat treated to make it high strength. While some manufacturers attempted to make the outer gear out of a stronger steel such a 550X, 550XF, or S700 steel having a higher carbon content, the problem was that due to the significant amount of forming that was required for the outer gear 30, the outer gear tended to crack in various places. Therefore, as of currently, no manufacturer has been able to form an outer gear out of a high carbon content steel such as a 550X steel.

Figure 13:
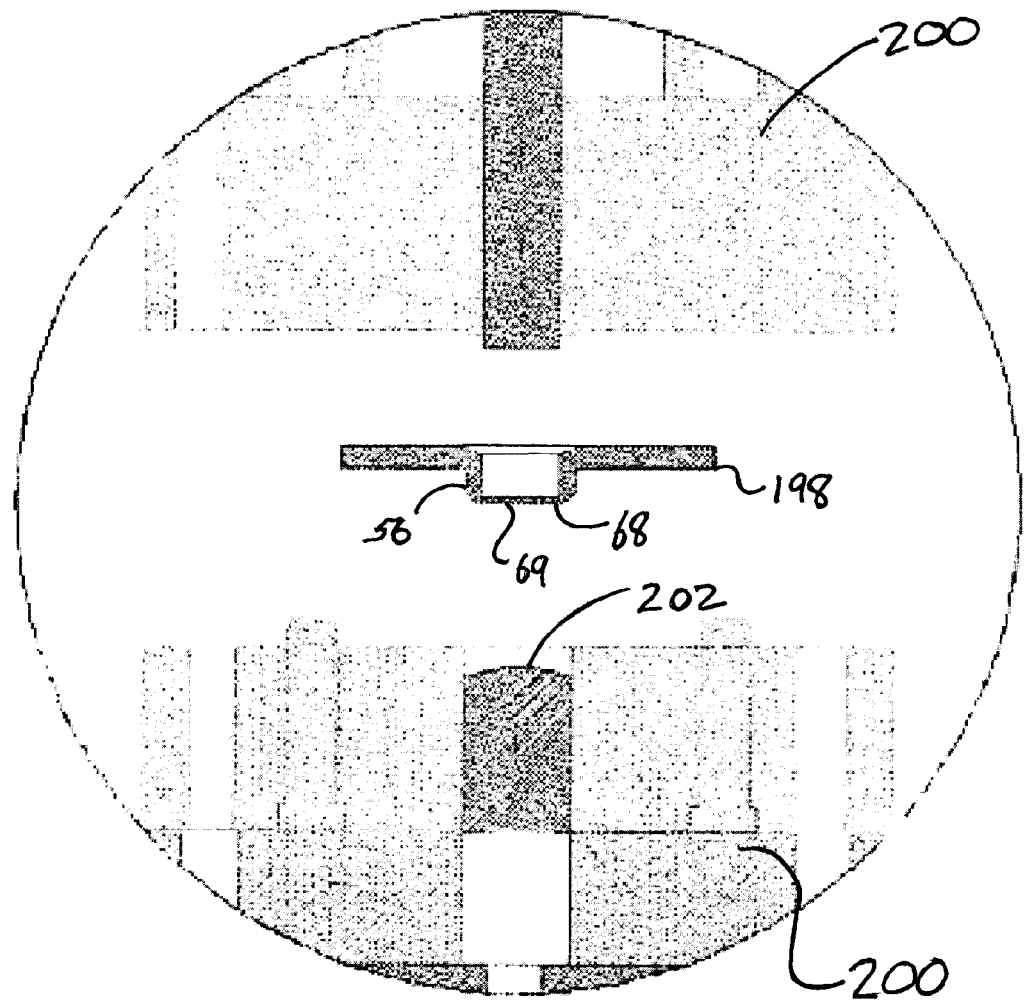
FIG. 13 illustrates a cross-sectional view of the dies used to form the metal sheet of FIGS. 11 and 12 and wherein the metal sheet is also illustrated in cross-section between the dies after forming.

The present invention starts with a flat sheet of steel of high carbon content such as a 550X steel and then proceeds to process the steel through both a forging and forming process. As illustrated in FIG. 11, first the center hub 56 including the end cap 68 is formed. As further illustrated in FIG. 13, as the hub 56 is being formed, the dies 200 use a convex die 202 to create a concave surface 69 illustrated in FIG. 11. Therefore, as the hub 56 is being formed, the dies 200 specifically the convex die 202 punches out the center hub 56 with an end cap having a concave surface 69 which moves material from the center of the end cap 56 to the end surface 64 of the center hub 56. Moving of this material compresses the end cap 68 causing the material to flow to the outside of the center hub 56 specifically near the end surface 64 and thereby preventing cracking during forming of the hub 56. While FIGS. 11, 12 and 13 only illustrate the forming of one concave surface 69 and on the inner side 26 of the outer gear 30, the opposing side of the end cap 68 or both sides of the end cap 68 may include concave surfaces 69.

Figure 14:
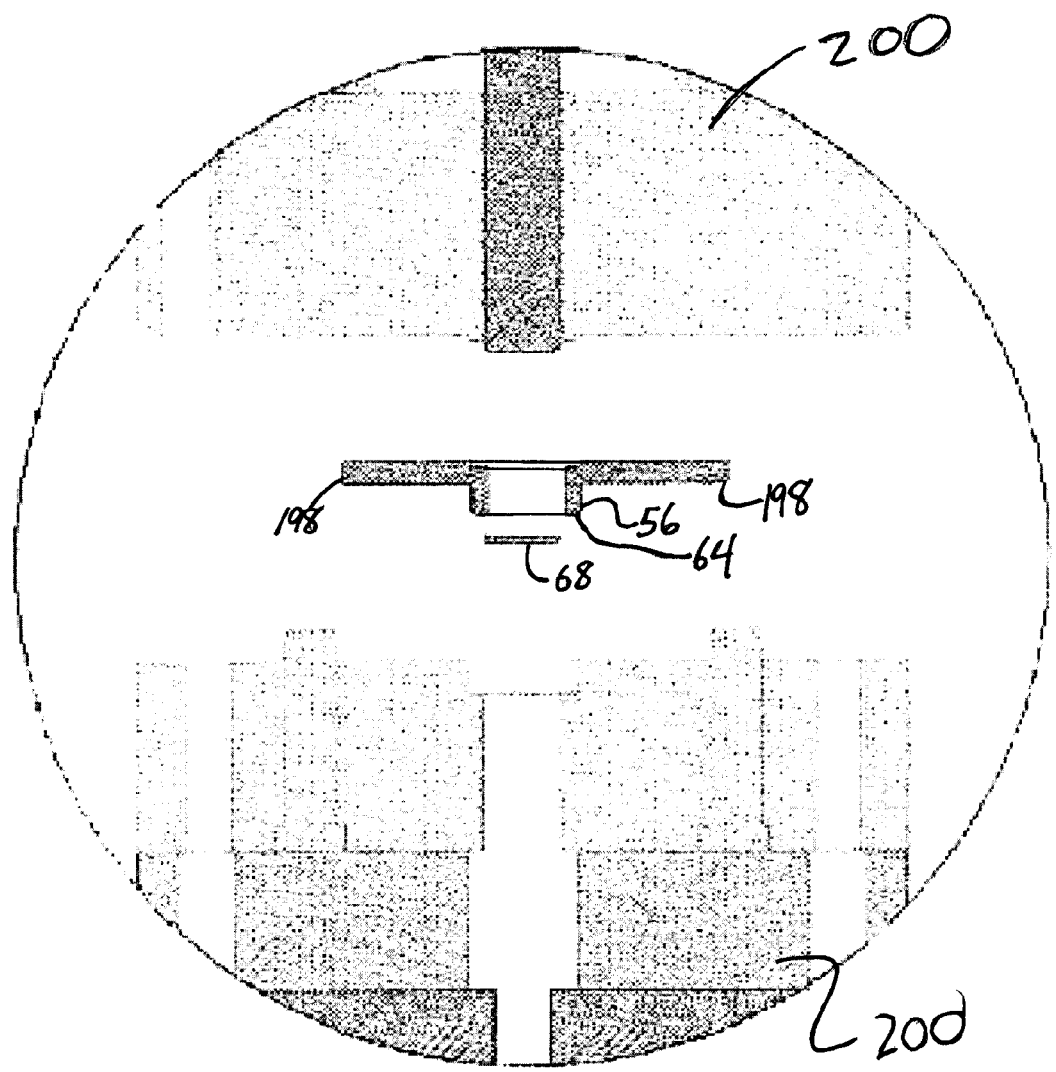
FIG. 14 schematically illustrates removal of the end cap from the hub.
Figure 15:
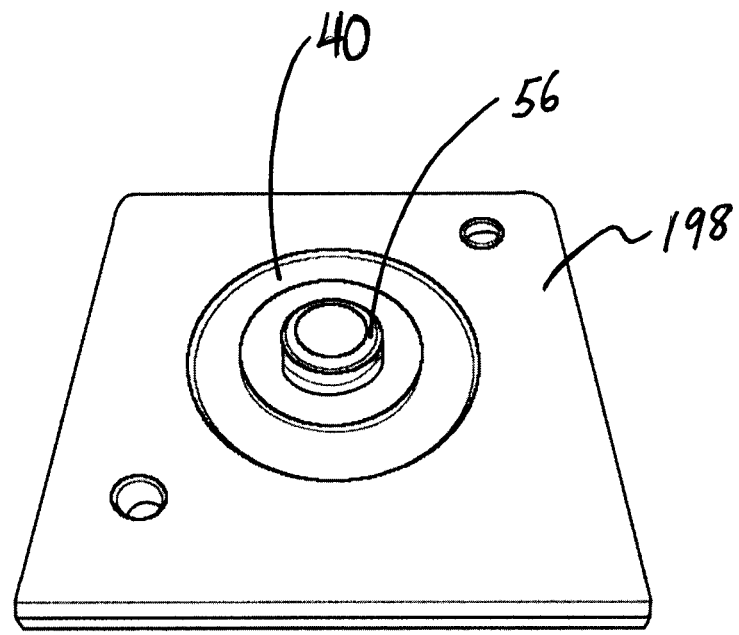
FIG. 15 is a perspective view of the partially formed inner surface of the gear surrounding the hub.
Figure 16:
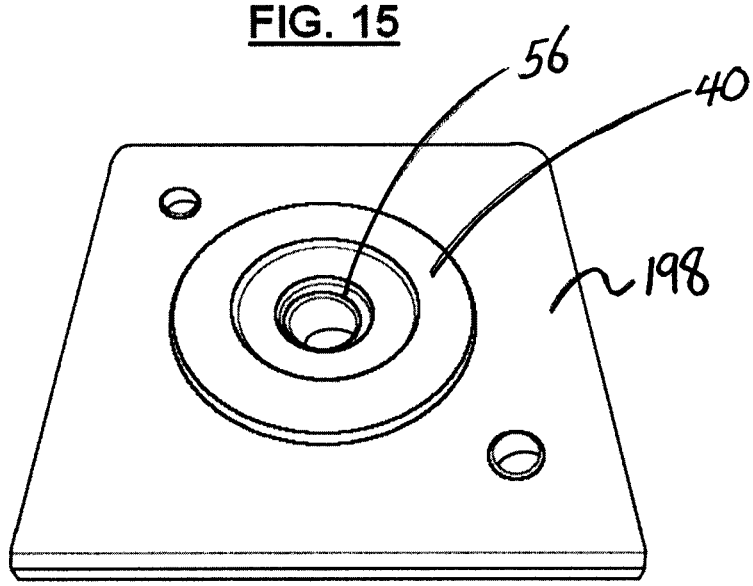
FIG. 16 is a perspective view of the outer surface of the outer gear in FIG. 15.
Figure 17:
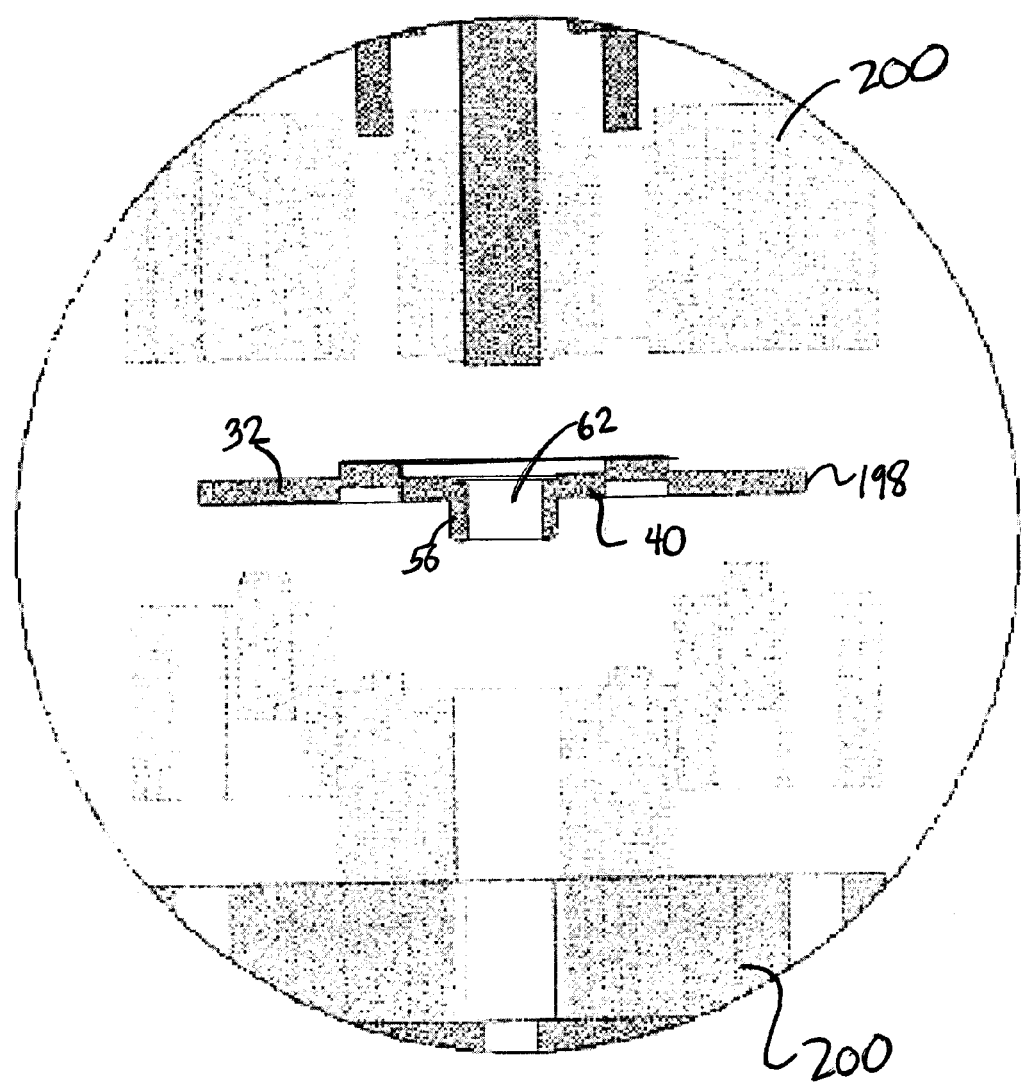
FIG. 17 is a schematic illustration of the dies used to form the metal sheet illustrated in FIGS. 15 and 16 with a cross-sectional view of the metal sheet between the dies after forming.

After the center hub 56 is partially formed with the end cap 68 having the concave surface 69 as illustrated in FIG. 14, the end cap 68 may be punched from the metal sheet forming the outer gear 30. Of course, other forming operations could occur during the step of punching such as the shapes being formed in FIGS. 15 and 16. While the steps may vary after the center hub 56 is formed with the concave surface 69 and end cap 68, the present invention in its exemplar steps forms the profile generally of the inner portion 50 of the outer gear 30. The profile of the inner portion 50 illustrated in FIGS. 15 and 16 is exemplary and could vary depending upon the desired configuration.

Figure 18:
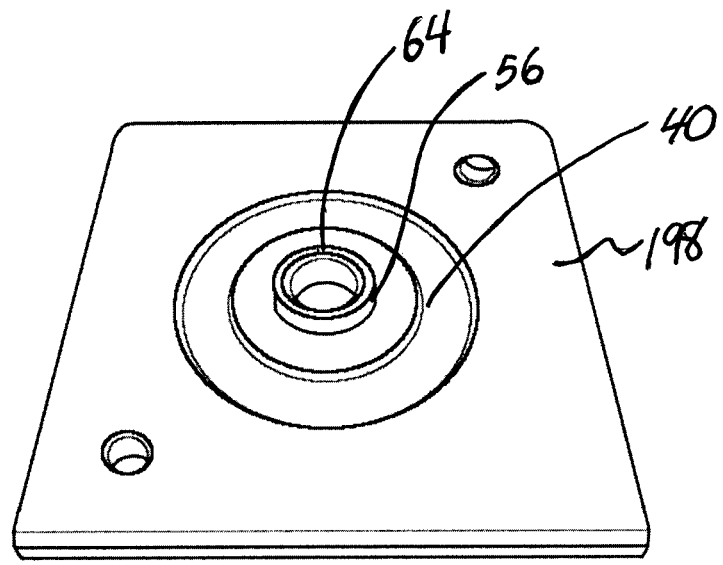
FIG. 18 illustrates the inner surface of the outer gear after additional forming steps to the outer edge of the hub.
Figure 19:
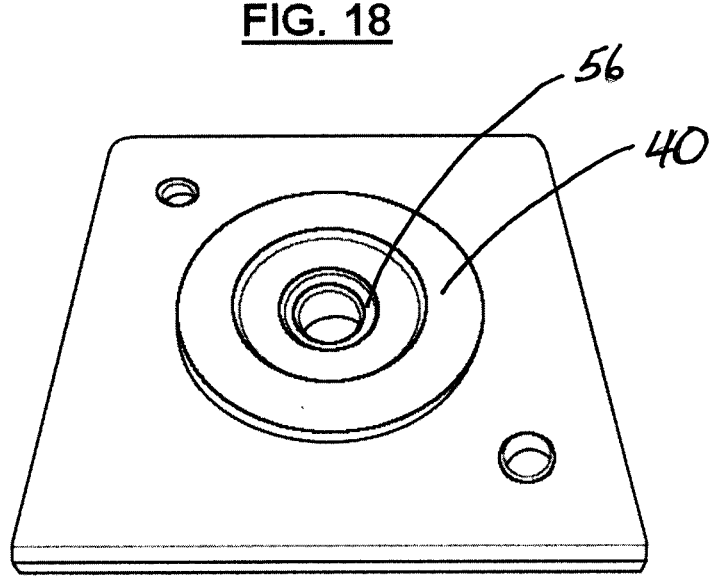
FIG. 19 is a perspective view of the outer surface of the outer gear of FIG. 18 illustrating additional forming steps to the hub.
Figure 20:
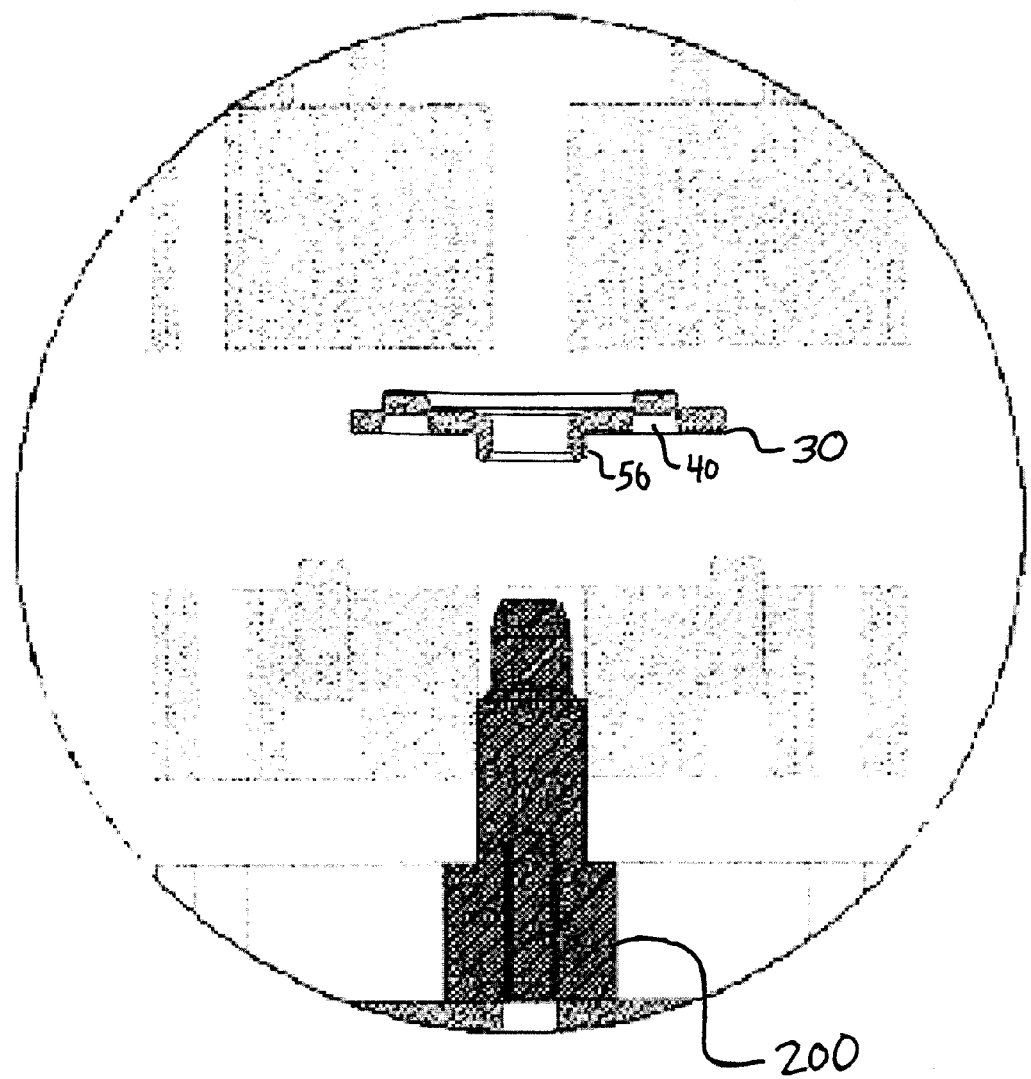
FIG. 20 is a schematic view in cross-section of the dies used to form the metal sheets in FIGS. 18 and 19 and a cross-sectional view of the metal sheet after forming therebetween.

After the inner portion 50 of the outer gear 30 is formed with the desired profile, the present invention then cold forges the center hub 56 further specifically creating certain beveled surfaces as clearly seen in FIGS. 18 and 19. These beveled surfaces are champers, provide further cold forging of the center hub and create a harder surface that does not need heat treating. FIG. 20 generally illustrates an exemplary set of dies 200 used to provide the formation of the profiled inner portion 50 as well as the additional forming steps to the center hub 56.

Figure 21:
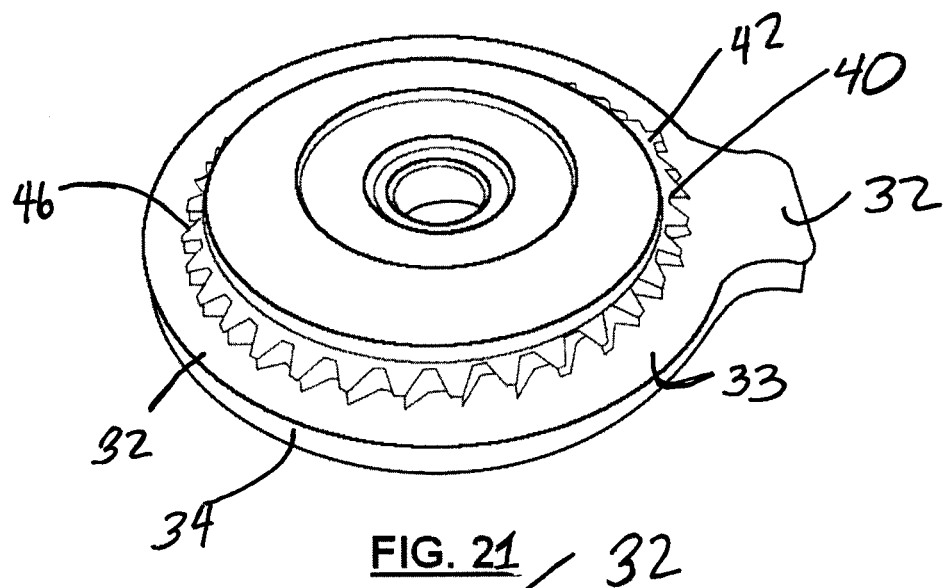
FIG. 21 is a perspective view of the outer surface of the completed outer gear.
Figure 22:
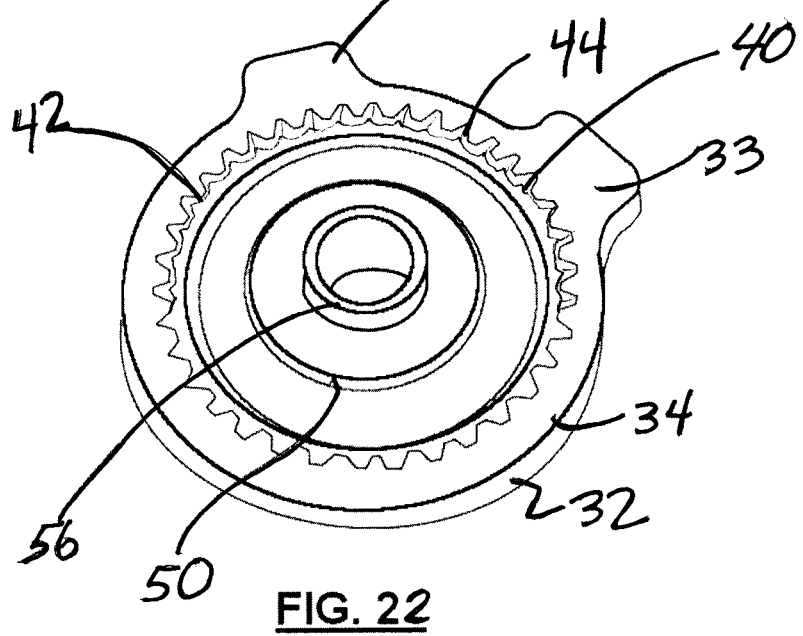
FIG. 22 is a perspective view of the inner surface of the completed outer gear of FIG. 20.
Figure 23:
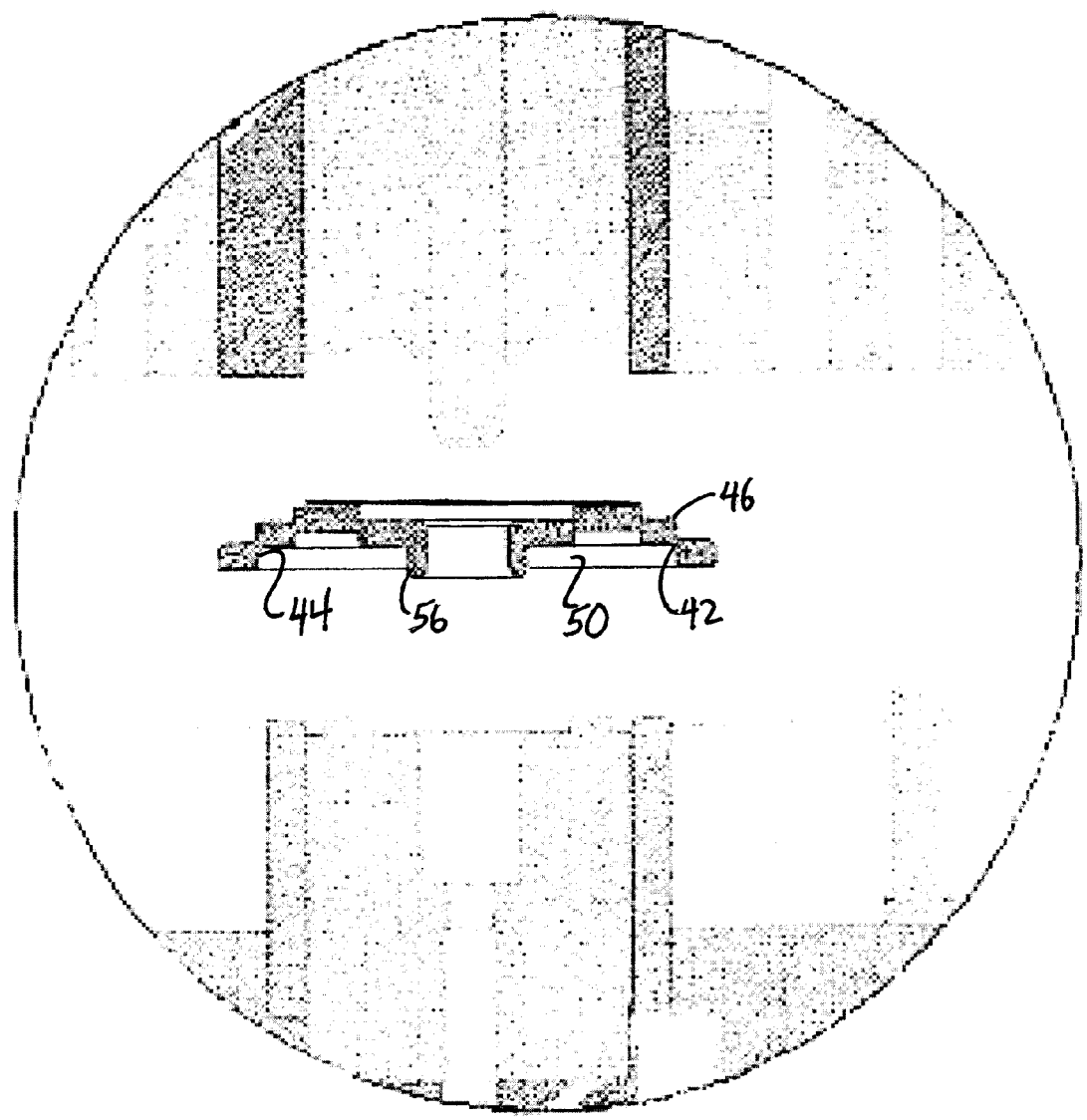
FIG. 23 is a schematic view of the dies in cross-section used to form the outer gear illustrated in FIGS. 21 and 22 with the outer gear after forming shown in cross-section therebetween.

FIGS. 21 and 22 further illustrate forming of the outer portion 32 and intermediate portion 40 specifically the tooth region 42. The dies 200 would generally support the formed center hub and semi-pierce the metal sheet at the intermediate portion 40 to form the tooth region 42 having a female gear teeth 44 and male gear teeth 46. The dies 200 may then continue to close to punch the outer gear 30 out from the metal sheet forming the outer edge 34 and outer extent 33. The finalized gears are illustrated in FIGS. 21 and 22 with exemplary dies 200 used thereby to form in FIG. 23.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A recline mechanism for a vehicle seat comprising:
   an eccentric carrier having a circumferential portion arranged around an axis and including an inner circumferential surface and an outer circumferential surface, a carrier tab extending radially from said outer circumferential surface, and a drive tab spaced from and extending outwardly along said axis and wherein said inner circumferential surface is approximately circular but not circular;
   a unitary rotating adjustment element having a circumferential hub extending outwardly therefrom and configured to engage said eccentric carrier;
   a bearing having an inner and outer surface; and
   a pair of wedges located on opposing sides of and proximate to said carrier tab and wherein each of said wedges including an outer face and an inner face, said outer face engaging said inner surface of said bearing and said inner face engaging said outer circumferential surface of said carrier;
   wherein said inner circumferential surface includes a first profiled portion approximately radially centered about said carrier tab, and said first profiled portion extends for some distance to each side of said carrier tab to under said pair of wedges.

2. The recline mechanism of claim 1 wherein the majority of said inner circumferential surface extends around said axis a first distance from said axis.

3. The recline mechanism of claim 2 wherein said first profiled portion extends a radial distance from said axis which is greater than said first distance.

4. The recline mechanism of claim 2 wherein said first profiled portion includes two opposing ends wherein said inner circumferential surface changes from being spaced greater than said first distance from said axis to being equal to said first distance from said axis.

5. The recline mechanism of claim 1 wherein said first profiled portion includes an arcuate shape and wherein the center of said arcuate shape is not said axis.

6. The recline mechanism of claim 5 wherein said inner circumferential surface includes a second profiled portion located radially opposite said first profiled portion along said inner circumferential surface.

7. The recline mechanism of claim 6 wherein each of said first and second profiled portions are capable of retaining a lubricant.

8. A recline mechanism including:
an inner gear having an axial hub defining an inner race;
a bearing having an inner and outer surface and wherein said outer surface engages said inner race;
an eccentric carrier having a radially extending carrier tab, an outer circumferential surface interrupted by said carrier tab and an inner circumferential surface;
a pair of wedges located on opposing sides of and proximate to said carrier tab and wherein each of said wedges including an outer face and an inner face, said outer face engaging the inner surface of said bearing and said inner face engaging said outer circumferential surface of said carrier;
rotating adjustment element having an outer cover and a circumferential hub extending therefrom and a race support also extending therefrom and wherein said adjusting element, outer cover, circumferential hub and race support are formed as a single member wherein said inner circumferential surface engages said circumferential hub approximately ninety radial degrees from said carrier tab;
wherein said inner circumferential surface includes a first profiled portion approximately radially centered about said carrier tab, and said first profiled portion extends for some distance to each side of said carrier tab to under said pair of wedges.

9. The recline mechanism of claim 8 wherein said eccentric carrier in said first profiled portion does not engage said circumferential hub.

10. The recline mechanism of claim 9 wherein said inner circumferential surface includes inner load areas displaced from said carrier tab.

11. The recline mechanism of claim 10 wherein said inner load areas are located in radial alignment with said pair of wedges.

12. The recline mechanism of claim 9 wherein said inner circumferential surface includes a second profiled portion located radially opposite of said carrier tab along said inner circumferential surface and wherein said second profiled portion does not engage said circumferential hub.

13. The recline mechanism of claim 8 wherein said inner circumferential surface is approximately circular but not circular.

14. The recline mechanism of claim 13 wherein said first profiled portion extends a radial distance from said axis which is greater than said first distance.

15. The recline mechanism of claim 13 wherein said first profiled portion includes an arcuate shape and wherein the center of said arcuate shape is not said axis.

16. The recline mechanism of claim 13 wherein said inner circumferential surface includes a second profiled portion located radially opposite said first profiled portion along said inner circumferential surface.

17. The recline mechanism of claim 8 wherein said eccentric carrier further includes a drive tab extending to engage a toothed shoulder on said rotating adjustment element.

18. A method of forming an outer gear for a seat recline mechanism, said method comprising:
providing a sheet of metal;
forming an enclosed hub on said sheet of metal having an end cap with at least one concave surface extending in a direction toward said enclosed hub;
wherein said concave surface is formed by a convex die flowing material from a center of said end cap to an end surface of the enclosed hub;
removing said end cap from said enclosed hub on said sheet of metal to form a hub;
forming inner rings on said sheet of metal;
forming outer beveled edges on said hub on said sheet of metal;
forming an intermediate member including gear teeth, wherein said gear teeth include female teeth and male teeth on the intermediate member; and
punching an outer gear from said sheet of metal forming an outer portion extending from said intermediate member to an outer edge.

19. The method of forming an outer gear of claim 18 wherein said step of forming an enclosed hub having an end cap with at least one concave surface further includes the steps of partially forming said hub and final forming said hub while creating a concave surface in said end cap to move material from said end cap to said hub.

\* \* \* \* \*